J. E. GRAY.
CONTROLLING DEVICE FOR AUTOMOBILE HEADLIGHTS.
APPLICATION FILED APR. 19, 1921.

1,437,732.

Patented Dec. 5, 1922.
2 SHEETS—SHEET 1.

Inventor
James E. Gray
by Orwig & Hague Attys.

J. E. GRAY.
CONTROLLING DEVICE FOR AUTOMOBILE HEADLIGHTS.
APPLICATION FILED APR. 19, 1921.
1,437,732.
Patented Dec. 5, 1922.
2 SHEETS—SHEET 2.
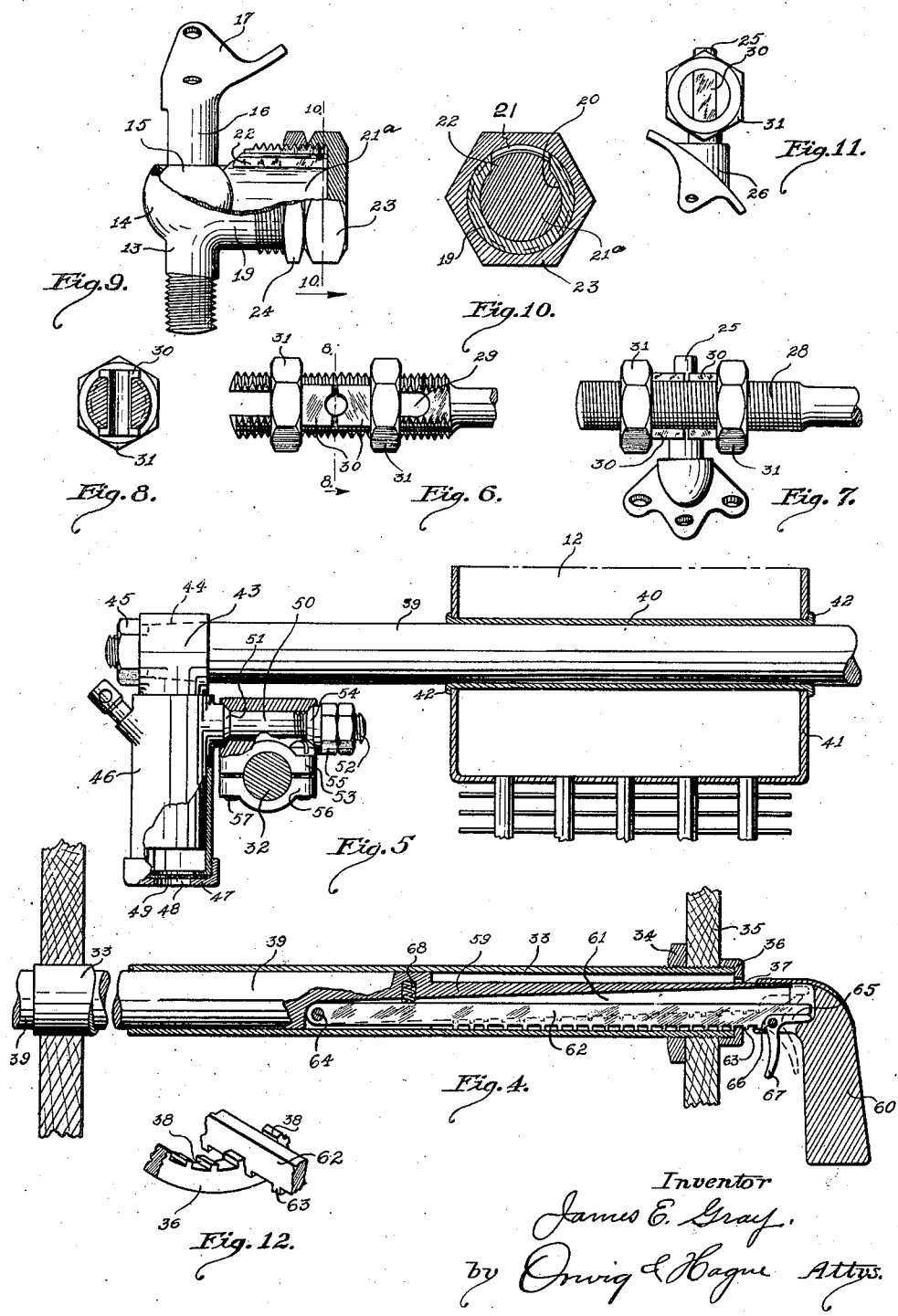

Patented Dec. 5, 1922.

1,437,732

UNITED STATES PATENT OFFICE.

JAMES E. GRAY, OF NEWTON, IOWA.

CONTROLLING DEVICE FOR AUTOMOBILE HEADLIGHTS.

Application filed April 19, 1921. Serial No. 462,681.

*To all whom it may concern:*

Be it known that I, JAMES E. GRAY, a citizen of the United States, and a resident of Newton, in the county of Jasper and State of Iowa, have invented a certain new and useful Controlling Device for Automobile Headlights, of which the following is a specification.

The object of my invention is to provide a simple, durable and inexpensive means for mounting and operating headlights for automobiles in such a manner that the lights may be moved by a suitable mechanism located in the cowl to throw the projected rays of light either in a horizontal or vertical plane.

A further object is to provide in such a mechanism improved means of simple construction for mounting the lamps, and also improved mechanism for actuating the said lamps, the said improved mechanism including means for adjusting all of the pivot members so as to eliminate rattle of the pivot members and vibration of the lamps.
A further object is to provide in mechanism for mounting and controlling headlights, which are capable of universal movement, improved means for adjusting the lamps so that the projecting rays therefrom may be either concentrated or spread over a greater area.

A still further object is to provide in a headlight for automobiles capable of universal movement and having means mounted in the cowl for operating the said headlights, improved means for locking the last said means against movement after it has been adjusted.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 4 is a sectional view of the rear end of the controlling mechanism showing the locking device in section, said device being mounted in segments of the dash and the cowl.

Figure 5 is a sectional view taken through the water container at the top of a radiator showing the manner in which the control rod is mounted therein, and also showing a portion of the telescopic and pivoted members in section.

Figure 6 is a detail plan view of the take-up device for the lamp pivots.

Figure 7 is a side elevation of Figure 6 showing one of the pivots in position.

Figure 8 is a sectional view taken on the line 8—8 of Figure 6.

Figure 9 is a detail and sectional view of the pivot members for supporting the lamps.

Figure 10 is a sectional view taken on the line 10—10 of Figure 9.

Figure 11 is an end elevation of Figure 7.

Figure 12 is a detail perspective view showing segments of the locking members in operative positions relative to each other.

Figures 1, 2, 3:
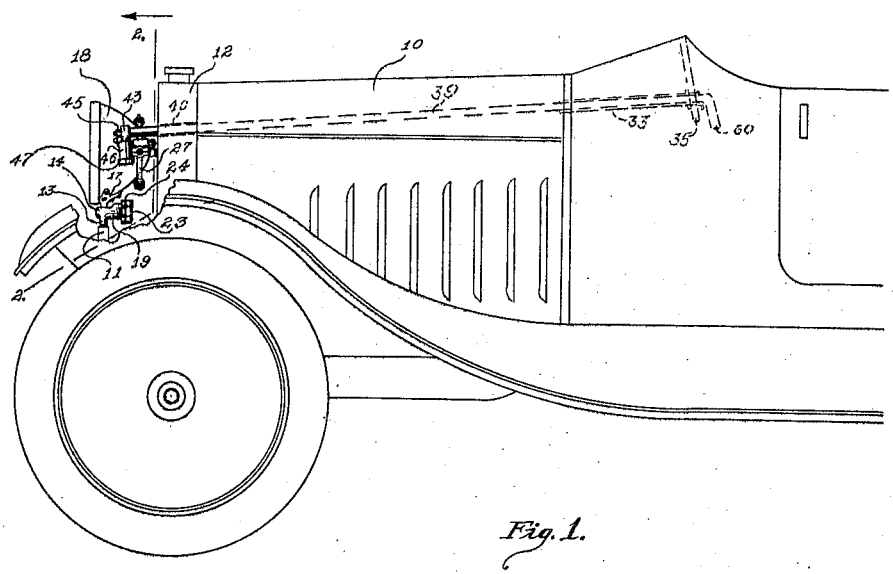
Figure 1 is a side elevation of the front portion of an automobile showing the manner in which my improved lamp supporting mechanism is applied thereto, a portion of the fender and one of the lamps being removed, part of the mechanism being shown in dotted lines.
Figure 2 is a sectional view taken on the line 2—2 of Figure 1.
Figure 3 is a plan view of Figure 2.

The numeral 10 indicates the front portion of an automobile which is provided with supports 11 at its forward end suitably mounted on the frame in front of the radiator 12. Each of these supports is provided with a screw threaded opening which is designed to receive the threaded portion 13 of the socket member 14. This socket member 14 is designed to receive a ball 15 having a stem 16, the upper end of said stem being provided with brackets 17. The said brackets 17 are designed to fit the under and forward side of the lamps 18, said lamps being of the ordinary construction such as is used in lighting systems for automobiles. The said numeral 18 indicates the exterior casing of the lamps.

For mounting the ball within the socket member 14, I have provided in said member a laterally extending portion 19 which is provided with a groove 20, the said groove being circular in section with a slot 21 in its upper face. The slot 21 is of a width slightly greater than the diameter of the post 16 so that the ball 15 may be placed in the groove 20 and slid into the position illustrated in Figure 9. The groove 20 is provided with a slide block 21ª which has its inner end formed to fit the ball 15, while its upper side is provided with a projection 22 to enter the slot 21 at the top of the groove 20.

The exterior portion of the member 19 is screw threaded and designed to receive a cap nut 23 which is designed to engage the outer end of the slide block 21ª to force the said block inwardly against the ball 15, thereby providing means for locking the said ball in its socket and at the same time provide means for taking up any wear which may be caused by the movement of the balls within the sockets.

In this connection, it will also be noted that this adjustment may be very delicately obtained. A lock nut 24 is provided for securing the cap 23 in position.

By this arrangement it will be seen that I have provided a pivot member for each of the lamps so arranged that the said lamps are capable of a limited universal movement.

For operating the lamps and imparting any desired movement thereto, I have provided adjacent to the rear side of the casings 18 pivoted pins 25 secured in brackets 26, the pivot pins 25 being mounted in a vertical plane extending through the center of the lamps, said plane being perpendicular to the faces, one of the pins being mounted to extend upwardly while the other is mounted to extend downwardly.

Each set of the said pins 25 is designed to carry a forked member 27, each of its prongs being provided with screw threaded portions 28, each of the said screw threaded portions having a slot 29, the said slot 29 being of a width slightly greater than the width of the pins 25.

Each of the slots 29 is designed to carry boxing members 30 which are slidably mounted therein, the said boxings being designed to fit the pins 25. A nut 31 is provided at each end of the said boxings and designed to coact with the screw threaded portions 28 in such a manner that the said boxings 30 may be forced toward each other for the purpose of taking up any wear which might be obtained after being operated for some time. This also provides means for adjusting the lamps as will hereinafter be described.

Each of the forked members 27 is secured to a corresponding end of a rod 32, the said rod 32 being of such a length that as the boxings 30 are positioned midway between the ends of the slots 29, the face of the lamps 18 will lay in a common plane. The forked members 27 are rigidly secured to the rod 32 so that any rotary movement of the said rod will impart a similar movement to each of the lamps. When the pins 25 have been mounted in the boxings 30 in the manner shown in Figure 2, it will be seen that the said lamps are rigidly held against a tilting movement toward or from each other, but are capable of movement about a vertical or horizontal axis of the ball 15.

The pivots 25 are placed back of the pivot centers of the balls 15 in such a manner that as a longitudinal movement is imparted to the shaft 32, a swinging movement will be imparted to the lamps 18 about a vertical axis to the center of the ball 15.

It will also be observed that on account of the rod 32 being placed at a point above a horizontal plane extending through the center of the ball 15, that any lateral movement imparted to the rod 32 will cause the lamps 18 to be rotated about a horizontal axis extending through the center of the balls 15.

By this arrangement, it will be observed that the lamps may be tilted by imparting a longitudinal movement to the rod 32, or by imparting a lateral movement, or by imparting both of said movements simultaneously.

For imparting these movements from the cowl of the automobile, I have provided the following mechanism. Mounted in the cowl and the dashboard of an automobile, I have provided a tube 33, one end of said tube being screw threaded and provided with a nut 34 which is designed to lay adjacent to the inner face of the cowl board 35. The outer end of the tube 33 is provided with a cap member 36 having an opening 37, the edge of said opening being provided with a series of teeth 38, as clearly shown in Figures 4 and 12.

Slidably and rotatively mounted in the tube 33, I have provided a shaft 39, the forward end of which extends through a bearing member 40 which extends through the radiator tank 41 and is sealed at 42 to form a water tight joint. The said shaft 39 extends forwardly and above the rod 32, the said rod 32 being mounted preferably as close to the radiator as possible.

The forward end of the shaft 39 is provided with a crank member 43 having a tapering opening 44 designed to fit a taper on the end of the shaft 39, the said member 43 being secured in position by means of a nut 45. The crank 43 is designed to extend downwardly in front of the rod 32 and to have slidably mounted a sleeve 46, the lower end of which is provided with a cap 47 having an opening 48. This cap 47 is designed to clamp a filter member 49 in position over the open end of the sleeve 46 to prevent dirt and foreign substances from entering the open end of the tube and also to permit air to enter the tube as the sleeve is reciprocated on the crank 43 so that the movement of the said crank will not be hindered due to creating vacuum on the lower end of the said sleeve.

The sleeve 46 is provided with a laterally extending pin 50 which has a cone bearing member 51 and its end screw threaded at 52. This pin 50 is designed to receive a half boxing member 53, said boxing being secured in position by means of a cone bearing 54 held in position by means of nuts 55. These cone bearings provide means for taking up any wear between the pin 50 and the boxing 53. The pin 50 being arranged parallel with the shaft 39 and transversely with the shaft 32, as clearly shown in Figure 5.

The under side of the boxing member 53 is provided with a groove to fit the rod 32 and also designed to carry a bearing member 56 which is held in position by means of screws 57. These half bearing members are shimmed apart so that the said members are free to rotate about the shaft. The shims may be removed for the purpose of adjusting the bearings for wear.

To prevent the bearings 53 and 56 from moving longitudinally on the rod 32, I have provided collar members 58 at each end of said bearings, said collars being formed in two pieces and clamped to the shaft by means of screws 57. The rear end of the shaft 39 is provided with a portion 59 which is of a smaller diameter than the main portion of the said shaft. This portion 59 extends through the opening 37 of the cap 36 and is provided with a handle member 60.

In the lower side of the member 59, I have provided a slot 61 in which is pivotally mounted a bar 62, the lower edge of said bar being provided with teeth 63. This bar is pivoted in the forward end of the slot 61 by means of a pivot 64. The rear end of the said bar 62 is mounted on a bell crank-shaped trigger 65 which is mounted in the handle 60 by means of a pivot 66 in such a manner that as the finger member 67 of said lever is moved toward the handle 60 the rear end of the bar 62 will be elevated so that the teeth 63 may disengage the edge of the cap 37.

In this connection, it will be noted that the distance between the teeth 63 is equal to the thickness of the cap 37 and the teeth 63 and 38 are so arranged that the bar 62 may rest between the teeth 38, and the edge of the cap 36 will rest between the teeth 63.

By this arrangement, I have provided a locking means whereby the shaft 39 may be absolutely locked against longitudinal or rotary movement. The spring 68 is provided in the shaft 39 and above the bar 62 for yieldingly holding the said bar in its outer limit of movement.

The practical operation of my device is substantially as follows:

Assuming that the lamps and mechanism are in the position shown in Figure 1 of the drawings, and the rays of light from the lamps 18 are projected in a horizontal plane and parallel to each other.

Assuming that it is desired to elevate the projecting rays of light, the operator grasps the handle 60 and places his finger ahead of the trigger 67. The said trigger is then moved toward the handle 60. This will elevate the bar 62 so that the teeth 38 and 63 will disengage each other.

The handle 60 is then moved rearwardly which will cause the shaft 39 to be moved longitudinally and the shaft 32 to be moved laterally and rearwardly. This will cause both of the lamps to be moved simultaneously backward and the rays of light elevated. The rays of light may be thrown downwardly by a reverse movement.

If it is desired to throw the rays of light either to the left or the right, the operator imparts a rotary movement to the shaft 39 through the handle 60. This causes the crank 43 to be oscillated, which in turn moves the shaft 32 longitudinally with itself, and the lamps swung about a vertical pivot as before described.

In this connection it will be noted that a slight telescopical movement will be imparted between the sleeve 46 and the crank 43 as the shaft 32 is moved longitudinally.

It will also be noted that as the shaft 39 is moved longitudinally, the shaft 32 will have a tendency to be elevated or lowered, which movement will be taken care of by the sleeve 46.

By this arrangement, the lamps may be quickly and accurately controlled from the handle 60 mounted near the cowl, and the said lamps may be rigidly locked in any desired position, and when so locked, will be held against movement or vibration, provision being made for taking up all wear which may be incurred by use.

It is sometimes desirable to focus the projecting rays of light which may be easily and quickly accomplished by adjusting the nuts 31 on the fork members 27, thereby throwing the pins 25 farther apart from each other.

This adjustment is also important due to the fact that the distance between the supports 11 vary in different machines and this adjustment is necessary in order to easily and quickly focus the lights.

By this construction, it will be seen that I have provided a single pivot member for each of the lamps, each of which is provided with means for taking up the wear.

This single pivot is quite an advantage over the ordinary construction which employs four pivots in order to obtain the universal movement, inasmuch as it is necessary in a device of this kind that it should be formed as light as possible, and at the same time all moving parts should be adjusted to prevent unnecessary movement due to wear.

I have therefore, eliminated all but a single supporting bracket and a single pivot, and I have also eliminated a large amount of unnecessary links and operating devices for operating the lamps.

I claim as my invention:

1. In a device of the class described, a frame, a pair of supports on said frame, a single pivot member for universal movement on each of said supports, a lamp for each pivot member, a rod mounted between said lamps, each end of said rod being provided with a pivot member having its axis at right angles to said rod, and said axes being in a common plane, means for pivotally connecting each of said lamps to a corresponding pivot member of said rod at one side of the central axis of said single pivot member in such a manner that if said rod is moved longitudinally or laterally a universal movement will be imparted to said lamps, and means for imparting a longitudinal and lateral movement to said rod.

2. In a device of the class described, a frame, a pair of supports on said frame, a single pivot for universal movement on each of said supports, a lamp casing on each of said pivots, a pair of pivot members for each of said lamps, a rod having a forked end for each pair of said pivot members, means for adjustably connecting each of said forked members with one of said pair of pivot members, means for imparting a longitudinal and lateral movement to said rod, and means for locking said rod in any position of its longitudinal or lateral movement.

3. In a device of the class described, a frame, a pair of supports on said frame, a single pivot member for universal movement on each of said supports, a lamp for each pivot member, a rod mounted between said lamps, each end of said rod being provided with a pivot member having its axis at right angles to said rod, and said axes being in a common plane, means for pivotally connecting each of said lamps to a corresponding pivot member of said rod at one side of the central axis of said support, in such a manner that if said rod is moved longitudinally or laterally a universal movement will be imparted to said lamps, means for imparting a longitudinal and lateral movement to said rod comprising a shaft arranged transversely with said rod, means for operatively connecting said shaft and said rod, means for imparting a longitudinal or rotary movement to said shaft, and means for locking said shaft in any of its positions of movement.

4. A frame, a plurality of upright supports each provided with a socket in its upper end, a ball for each of said sockets capable of a limited universal movement and provided with a lamp supporting bracket, a lamp supported at its forward edge and its lower side to each of said brackets, a pair of pivot members for the back of each of said lamps in a plane with a corresponding ball, a horizontally arranged rod forked at each end, means for adjustably and pivotally connecting each member of said forks to a corresponding pivot member of said lamps, and means for moving said forked rod longitudinally or laterally to impart a limited universal movement to said lamps.

5. A frame, a plurality of upright supports each provided with a socket in its upper end, a ball for each of said sockets capable of a limited universal movement and provided with a lamp supporting bracket, a lamp supported at its forward edge and its lower side to each of said brackets, a pair of pivot members for the back of each of said lamps in a plane with a corresponding ball, a horizontally arranged rod forked at each end, means for adjustably and pivotally connecting each member of said forks to a corresponding pivot member of said lamps, and means for moving said forked rod longitudinally or laterally to impart a limited universal movement to said lamps, said means comprising a shaft arranged with one end substantially perpendicular and adjacent to said forked rod capable of a rocking and longitudinal movement, means for operatively connecting the adjacent end of said shaft to said forked rod, a handle for the opposite end of said shaft, and means for locking said shaft in a number of its longitudinal or rotary positions of movement.

6. A frame, a plurality of upright supports each provided with a socket in its upper end, a ball for each of said sockets capable of a limited universal movement and provided with a lamp supporting bracket, a lamp supported at its forward edge and its lower side to each of said brackets, a pair of pivot members for the back of each of said lamps in a plane with a corresponding ball, a horizontally arranged rod forked at each end, means for adjustably and pivotally connecting each member of said forks to a corresponding pivot member of said lamps, and means for moving said forked rod longitudinally or laterally to impart a limited universal movement to said lamps, said means comprising a shaft arranged with one end substantially perpendicular and adjacent to said forked rod capable of a rocking and longitudinal movement, telescopic and pivoted means for operatively connecting the adjacent end of said shaft to said forked rod, a handle for the opposite end of said shaft, and means for locking said shaft in a number of its longitudinal or rotary positions of movement.

7. A frame, a pair of supports, a lamp pivoted for universal movement on each of said supports, a rod pivotally connected with said lamps in such a manner that a longitudinal or lateral movement of the same will impart a universal movement to said lamps, a shaft having one end near said rod and substantially perpendicular thereto, a divided bearing member rotatively mounted on said rod, adjustable means for securing said members together, a collar on said rod at each end of said bearing member, a sleeve member pivotally connected to one of said bearing members, a crank member for the adjacent end of said shaft slidably mounted in said sleeve, a handle for the opposite end of said shaft, and means for locking said shaft in any of its positions of movement.

8. The combination of an automobile chassis having lamp supports, a dash member and a cowl board, a lamp pivotally mounted on each of said supports for a limited universal movement, a tube mounted in said dash and cowl boards, a rod rotatively and slidably mounted in said tube, means for operatively connecting the end of said rod with said lamps whereby a longitudinal or rotative movement of said shaft will impart universal movement to said lamps, a handle on the opposite end of said rod, a slot in said rod adjacent to said handle, a toothed rack in said slot, a cap on the end of said tube extending over said rod and provided with teeth to coact with the teeth in said rack, and means for moving said rack out of engagement with the teeth of said cap.

9. In a device of the class described, a frame, a plurality of lamps on said frame mounted for limited universal movement, a tube in said frame, a cap for one end of said tube having an opening, the inner edge of said opening being provided with teeth, a shaft rotatively mounted in said tube and extending through the opening of said cap, said shaft being capable of longitudinal or rotative movement, means connected with one end of said shaft and with said lamps, a handle on the opposite end of said shaft adjacent to said cap, said shaft being provided with a slot adjacent to said handle, a pivoted bar in said slot having one edge provided with teeth designed to engage said cap between the teeth therein to prevent longitudinal or rotative movement of said shaft, and means for moving the teeth of said bar out of engagement with the teeth of said cap.

10. The combination of an automobile chassis having lamp supports, a cowl board, a lamp pivotally mounted on each of said supports for a limited universal movement, a cap mounted on said cowl and provided with an opening having internal teeth, a shaft rotatively and slidably mounted in the opening of said cap, means for operatively connecting the end of said shaft to said lamps whereby a longitudinal or rotative movement of said shaft will impart universal movement to said lamps, a handle on the opposite end of said shaft, a slot in said shaft adjacent to said handle, a toothed rack in said slot adapted to engage the teeth of said cap and means for moving said rack out of engagement with the teeth of said cap.

Des Moines, Iowa, April 11, 1921.

JAMES E. GRAY.